US005748571A

United States Patent [19]

Jackl

[11] Patent Number: 5,748,571

[45] Date of Patent: May 5, 1998

[54] PLASTIC TOP SHELL

[75] Inventor: Werner Jackl, Coventry, R.I.

[73] Assignee: Textron Inc., Providence, R.I.

[21] Appl. No.: 886,792

[22] Filed: May 20, 1992

[51] Int. Cl.[6] .............................. G04B 27/00; A44C 5/04; F16G 13/00

[52] U.S. Cl. .............................. 368/282; 59/79.1; 63/5.1; 63/6; 224/164

[58] Field of Search .............................. 59/79.1, 79.3, 59/80; 63/5.1, 6; 224/164–180; 368/281–282

[56] References Cited

U.S. PATENT DOCUMENTS

| | | | |
|---|---|---|---|
| 3,344,599 | 10/1967 | Hauser | 59/79.1 |
| 3,494,123 | 2/1970 | Kremer | 59/79.1 |
| 3,587,226 | 6/1971 | Rieth | 63/5.1 |
| 3,590,576 | 7/1971 | Bubinelu | 63/5.1 |
| 3,625,061 | 12/1971 | Levinger | 63/5.1 |
| 3,786,629 | 1/1974 | Rieth | 59/79.1 |
| 4,706,857 | 11/1987 | Aellen et al. . | |
| 4,723,406 | 2/1988 | Ripley | 59/79.1 |

FOREIGN PATENT DOCUMENTS

| | | |
|---|---|---|
| A-0167891 | 1/1986 | European Pat. Off. . |

OTHER PUBLICATIONS

Suwa Seikosha K.K., JP-A-60 220 889, Nov. 5, 1985, "Patent Abstracts of Japan", vol. 10, No. 84, (P-442)(2141), Apr. 3, 1986.

*Primary Examiner*—Vit W. Miska

*Attorney, Agent, or Firm*—Samuels, Gauthier, Stevens & Reppert

[57] ABSTRACT

A plastic top shell for use on a metallic top link of an expansible watch band, the top link having a hollow box-like configuration with open ends and with top and bottom walls joined by side walls. The plastic top shell comprises a molded body having a top surface and a bottom surface with end tabs protruding downwardly therefrom. The bottom surface has coplanar end portions adjacent to the ends tabs, with the top and bottom surfaces defining a thickness therebetween which is greater than the thickness of the end tabs. The body is configured and dimensioned to overlie the top wall of the top link, with the end tabs being bendable around the open ends of the top link to thereby firmly seat the coplanar end portions of the molded body's surface against the top link wall.

5 Claims, 1 Drawing Sheet

PLASTIC TOP SHELL

BACKGROUND OF THE INVENTION

1. Field of the Invention

This invention relates generally to expansible watch bands, and is concerned in particular with an improved decorative top shell molded from plastic material, e.g., LEXAN or the like.

2. Description of the Prior Art

The conventional expansible watch band typically includes a row of top links overlying a row of bottom links. The top links have hollow box-like configurations with open ends and with top and bottom walls joined by side walls. Each bottom link is connected to two adjacent top links by pairs of U-shaped staples. Springs housed in the links coact with the staples to yieldably contract the band. The top and bottom links as well as the staples and springs are typically fabricated as metal stampings, and the top links are usually covered with decorative metallic top shells.

In the past, as disclosed for example in U.S. Pat. No. 4,958,334 (Grosjean), such watch bands have been coupled to plastic watch cases by end connector assemblies employing both metallic and plastic components. Here, the metallic components are externally located to conform in appearance to the metallic band, and the plastic components are internally arranged to isolate the plastic watch case from damaging frictional contact with the metallic band and end connector components.

While this arrangement is generally satisfactory from the standpoint of structural integrity and wear resistance, it has certain styling drawbacks resulting from the stark visual contrast between the metallic band and the plastic watch case.

A uniform appearance can be achieved by applying a metal cap to the watchcase, but this eliminates the styling possibilities afforded by the wide color variations which are available with plastic materials.

In light of the foregoing, recent design proposals have focused more on conforming the appearance of the band to the plastic watch case. In addition to requiring a redesign of the end connector assembly in order to reverse the location of the metallic and plastic components (the subject of a separate application being filed concurrently herewith), this also requires that new plastic top shells be provided which blend visually with the plastic watch case. The present invention is directed to the provision of such plastic top shells.

SUMMARY OF THE INVENTION

The basic objective of the present invention is to provide a new plastic top shell which is aesthetically compatible with a watch case also molded of plastic material.

A companion objective of the present invention is to substantially broaden the range of top shell configurations available to the designer by freeing the contour of the top surface from certain structural restraints inherent in the use of metallic top shells.

In a preferred embodiment of the invention to be described hereinafter in more detail, these and other objects and advantages are achieved by the provision of a plastic top shell consisting of a molded body having a top surface, a bottom surface with end tabs protruding downwardly therefrom, and with coplanar end portions on the bottom surface located adjacent to the end tabs. The top and bottom surface define a thickness therebetween which is greater than the thickness of the end tabs.

The molded body is configured and dimensioned to overlie the top wall of a top link, and the end tabs are bendable around the open ends of the top link to thereby firmly seat the coplanar end portions of the top shell's bottom surface against the top wall of the link.

The thickness of the molded body can vary as a result of changes in the contour of the top surface, with maximum thicknesses occurring at any desired location, independently of the requirement for stable support of the top shell on the underlying top link.

DETAILED DESCRIPTION OF PREFERRED EMBODIMENT

Figure 1:
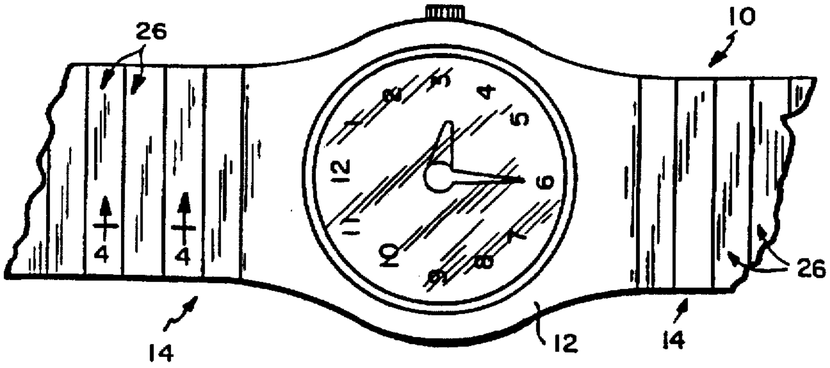
FIG. 1 is a partial top plan view showing a watch and watch band, the latter having top shells according to the present invention.
Figure 2:
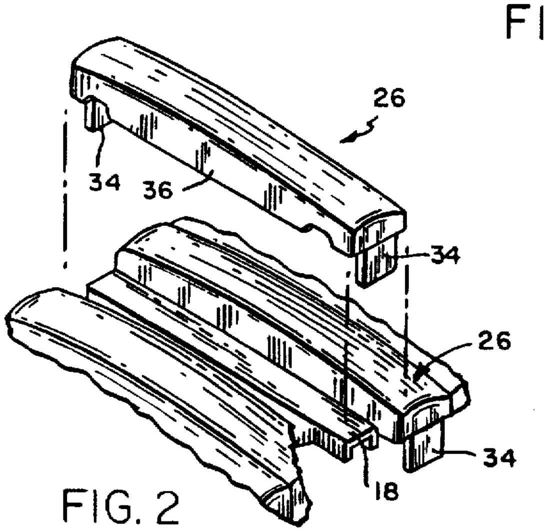
FIG. 2 is perspective view of a portion of the watch band showing one of the plastic top shells removed from its respective top link.
Figure 3:
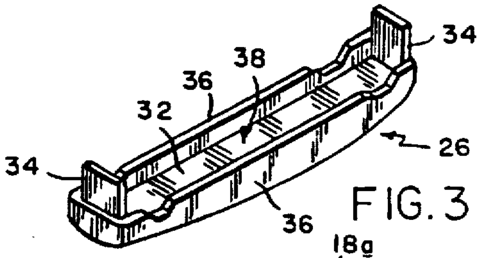
FIG. 3 is a bottom perspective view of a plastic top shell.
Figure 4:
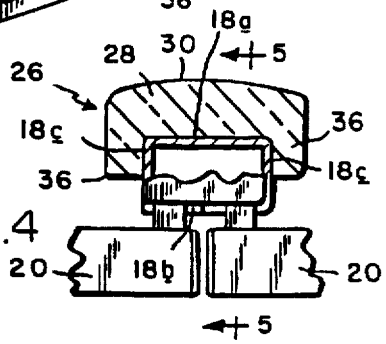
FIG. 4 is an enlarged sectional view taken along line 4—4 of FIG. 1.

Referring now to the drawings, a watchband 10 is shown coupled to a watch having a plastic watch case 12 by means of end connector assemblies generally indicated at 14.

The watch band is of known construction, comprising a row of top links 18 overlying a row of bottom links 20. Each bottom link 20 is connected to two top links 18 by means of opposing pairs of U-shaped staples 22, the latter being acted upon by leaf springs 24 housed in the links. The leaf springs coact in resilient engagement with the staples to accommodate longitudinal expansion and contraction of the band in a manner well known to those skilled in the art.

The top links 18 have a hollow box-like configuration defined by top and bottom walls 18*a*, 18*b* and side walls 18*c*, with open ends extending laterally beyond the ends of the bottom links.

The top links 18 are covered by decorative plastic top shells 26. The top and bottom links 18, 20 and the staples 22 and springs 24 are all fabricated as metallic stampings, whereas the top shells 26 are molded of plastic materials which are visually compatible with the plastic watch case 12.

Each plastic top shell 26 comprises a molded body 28 having a top surface 30 and a bottom surface 32 with end tabs 34 protruding downwardly therefrom. The bottom surface 32 has coplanar end portions 32*a* adjacent to the end tabs 34. The top and bottom surfaces 30, 32 define a thickness therebetween which is greater than the thickness of the tabs 34.

Preferably, the molded body 28 is additionally provided with downwardly depending side flanges 36 which cooperate with the bottom surface 32 and the end tabs 34 to define a downwardly open recess 38.

Figure 5:
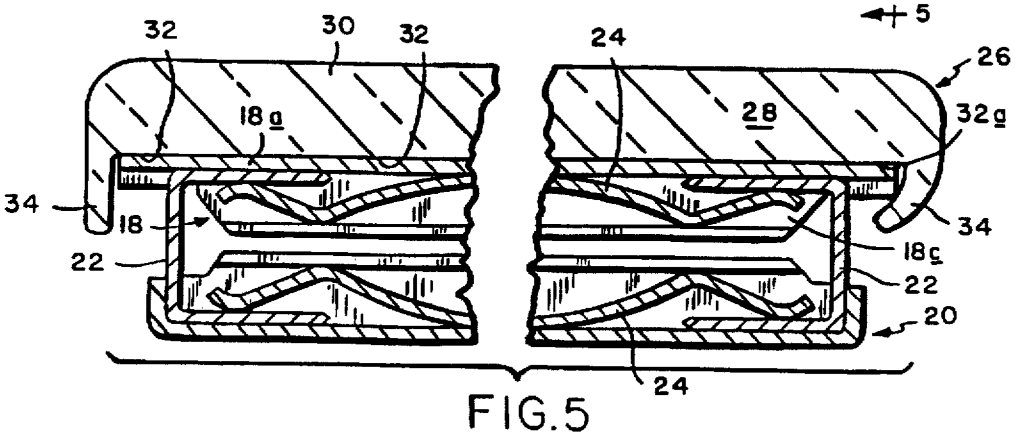
FIG. 5 is a further enlarged view taken along line 5—5 of FIG. 4.

The molded body 28 is suitably configured and dimensioned to overlie the top wall 18*a* of a top link 18, with the upper portion of the link being received in the recess 38, and as illustrated on the left hand side of FIG. 5, with each tab 34 extending downwardly past a respective open end of the top link.

Thereafter, a tool (not shown) is used to bend the tab inwardly under the top wall 18*a* of the link to the position shown at the right hand side of FIG. 5. The thus bent tab extends around the open end of the link and thereby firmly seats the coplanar end portions 32*a* of the bottom surface 32 downwardly onto the top link wall 18*a*.

Figure 6:
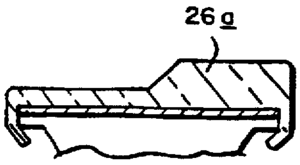
FIGS. 6 and 7 are schematic sectional views showing various design configurations which can be accommodated by the plastic top shell of the present invention.
Figure 7:
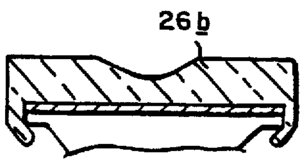
Figure 8:
FIG. 8 PRIOR ART
FIG. 8 is a schematic sectional view of a typical metallic top shell.

All visible portions of the top links 18 are thus covered by the plastic material of the top shells 26. The seating of the coplanar end portions 32*a* of the bottom surface on the top wall 18*a* provides stable support for the top shell, regardless of the configuration of the top surface 30. Thus, as shown in FIG. 6, a top shell 26*a* can have one end thicker than the other, or as shown at 26*b* in FIG. 7, both ends can be thicker than the middle portion. As illustrated in FIG. 8, such design variations would be impossible with stamped metallic top shells due to the uniform thickness of the material and the need to provide support for the top shell as at 40 along both edges of the band.

The plastic top shells can be transparent, translucent, or opaque, and they may be colored or tinted to suit a wide range of design themes.

I claim:

1. For use on a metallic top link of an expansible watch band, said top link having a hollow box-like configuration with open ends and with top and bottom walls joined by side walls, a plastic top shell comprising: a molded body having a top surface and a bottom surface with end tabs protruding downwardly therefrom, said bottom surface having coplanar end portions adjacent to said ends tabs, said top and bottom surfaces defining a thickness therebetween which is greater than the thickness of said end tabs, said body being configured and dimensioned to overlie the top wall of said top link, said end tabs being bendable around the open ends of said top link to thereby firmly seat the coplanar end portions of said bottom surface against said top wall.

2. The plastic top shell of claim 1 wherein the thickness defined between said top and bottom surfaces varies between a maximum and a minimum.

3. The plastic top shell of claim 2 wherein the molded body has a minimum thickness at one end thereof and a maximum thickness at an opposite end thereof.

4. The plastic top shell of claim 2 wherein the molded body has a maximum thickness at at least one end thereof.

5. The plastic top shell of claim 1 wherein the molded body is additionally provided with flanges depending downwardly from the sides thereof, said flanges cooperating with said bottom surface and said end tabs to define a recess configured and dimensioned to receive the upper portion of said top link.

* * * * *